TRANSISTOR PULSE REPEATER NETWORK

Filed June 21, 1966

INVENTORS
RICHARD O. ROWLANDS
EDWARD L. ROHM
BY
ATTORNEY

United States Patent Office 3,457,508
Patented July 22, 1969

3,457,508

TRANSISTOR PULSE REPEATER NETWORK

Richard O. Rowlands and Edward L. Rohm, State College, Pa., assignors, by mesne assignments, to the United States of America as represented by the Secretary of the Navy Filed June 21, 1966, Ser. No. 560,379
Int. Cl. H04b 7/18
U.S. Cl. 325—13 5 Claims

ABSTRACT OF THE DISCLOSURE

A pulse repeater system including a series of transmission line connected repeaters each having a transistor and diode biasing circuitry interconnected between input and output auto transformers and including input and output coupling transformers connected to D.C. power supplies, the input coupling transformer being connected to a pulse source and the output coupling transformer being connected to an amplifier, a clipper and a pulse clocked flip-flop for reconstructing discrete binary signals.

This invention relates to pulse communication systems and more particularly to the regeneration in amplitude and time of pulse signals which may be distorted in the course of transmission.

The transmission of ON and OFF pulses or binary signals over long ranges without the introduction of distortion has necessitated the use of pulse repeaters or regeneration circuits to re-establish both the amplitude and time relationship between the transmitted pulses and the received pulses. Various types of repeaters have been employed for this application ranging from the early vacuum tube types to the newer transistorized repeaters. However, even with the introduction of newer and more miniaturized components, the need for a reliable compact pulse repeater still exists.

One of the basic problems encountered in pulse repeater systems is that of supplying the D.C. power necessary to operate each repeater. To overcome this problem, numerous techniques have been devised for minimizing the power loss in the cable and in the repeater itself. For example, reservoir capacitors have been employed for storing sufficient energy to operate the repeater during the pulsed intervals. However, such systems have obvious shortcomings. In particular, the capacitor is necessarily quite large and additionally limits the repetition frequency of the pulse information. In instances where transformer coupling has been employed, the D.C. currents flow through one of the transformer windings and hence cause magnetization of the core. This is another one of the disadvantages of the prior art devices.

An additional problem encountered in prior art repeater systems is the high cost of the coaxial cables which are used because of their low attenuation characteristics with respect to the balanced pair cable. To further aggravate the situation, both the signal power and the D.C. power are transmitted in the same mode, necessitating larger diameter cables to handle the increased power.

The general purpose of the present invention is therefore to provide a pulse repeater which embraces all the advantages of similarly employed repeaters and possesses none of the aforedescribed disadvantages. To attain this, the present invention contemplates separating the operating D.C. power from the signal information by transmitting the power as a longitudinal current and the signal information as a transverse current. The signal power and D.C. power are seperated at the input and recombined at the output of each repeater, thereby minimizing the magnetic effects in the repeater.

Additionally, the present invention employs the use of inexpensive balanced pair transmission lines between each repeater which results in a less costly system; however, coaxial transmission lines may be employed if desired. Also by the use of a minimum number of components, the pulse repeater of the present invention is more reliable and may be readily miniaturized.

Accordingly, it is an object of the present invention to provide a repeater in which the amplitude and time of a pulse trains is periodically re-established and in which a minimum number of components are employed thereby reducing the size and cost of the repeater and improving its reliability.

Another object of the invention is to provide a regeneration circuit in which solid state devices are employed as switching elements and in which more efficient and virtually undistorted signals can be regenerated at each repeater even from a distorted input signal.

With these and other objects in view, as will hereinafter more fully appear, and which will be more particularly pointed out in the appended claims, reference is now made to the following description taken in connection with the accompanying drawing in which:

Figures 1, 2, 3, 4:
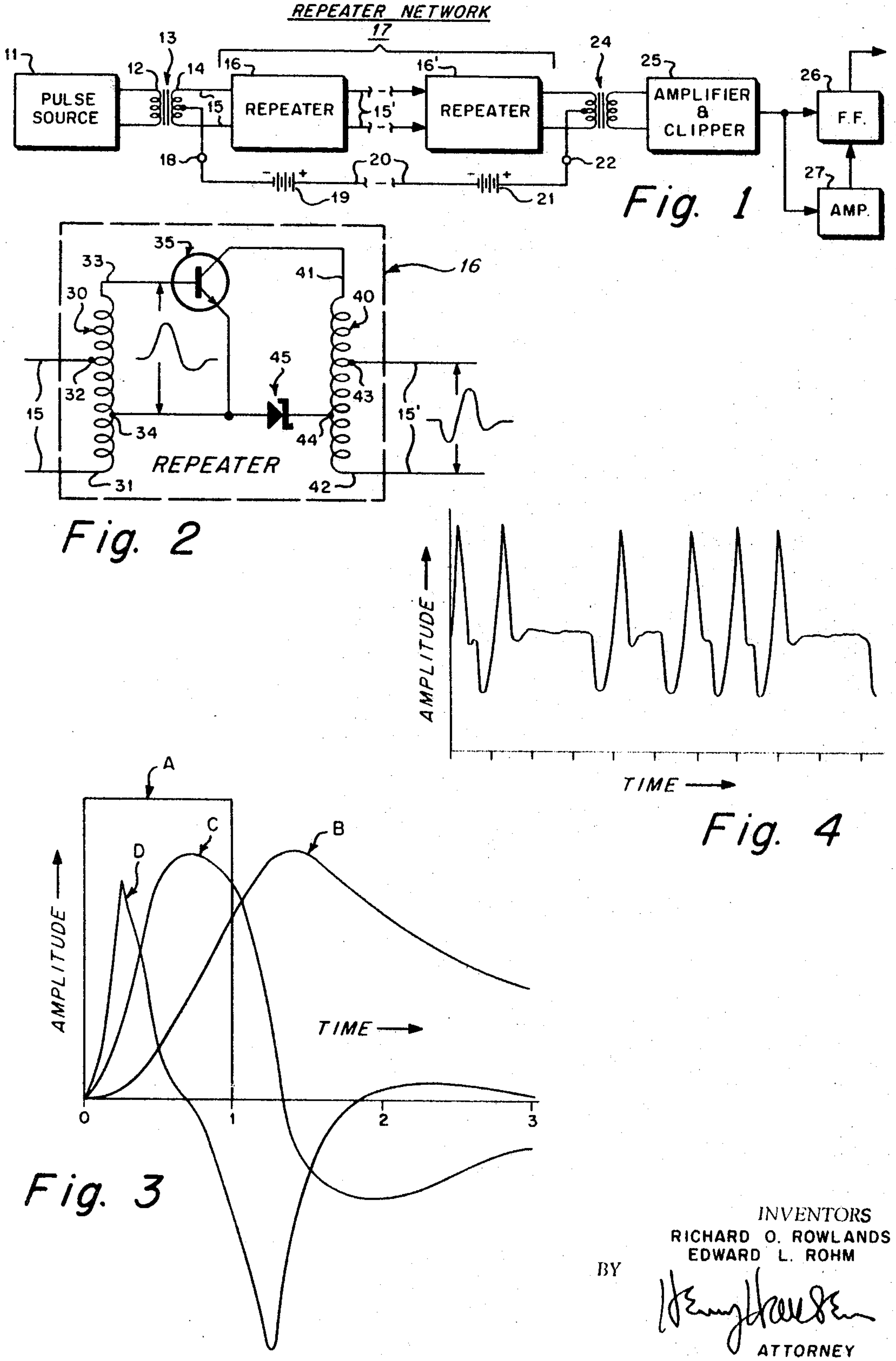
FIG. 1 illustrates a partial block and schematic diagram of a repeater system according to an embodiment of the invention.
FIG. 2 illustrates a schematic diagram of a pulse repeater employed in FIG. 1.
FIG. 3 illustrates typical amplitude vs. time wave forms associated with the repeater system of FIG. 1.
FIG. 4 shows a typical amplitude vs. time pulse pattern from the output repeater system of FIG. 1.

Briefly, the invention provides a novel pulse repeater in which coded binary signals are periodically regenerated and transmitted over great distances and in which the amplitude and time of a received signal has a fixed time relationship with a transmitted signal.

Referring now to the drawing, there is shown in FIG. 1 which illustrates an embodiment of the invention, a pulse source 11 for applying a train of binary signals to a primary winding 12 of a transformer 13. A center tapped secondary winding 14 has its outside terminals connected through a transmission line 15, which for purposes of illustration may be a balanced pair cable, to a repeater 16, a schematic diagram of which is illustrated in FIG. 2. The inductive reactance of the secondary winding 14 is matched with that of the transmission line 15 to provide maximum power transfer and to eliminate standing waves.

A center tap 18 of transformer 13 is connected to the negative terminal of a power supply 19 illustrated as a battery in FIG. 1, but may be any conventional type power supply having the requisite power requirements for the repeater network. The positive terminal of the battery 19 may be connected to a ground reference, or, as illustrated in FIG. 1, through a conductor 20 to the negative terminal of another power source 21. The positive terminal of the power source 21 is connected to a center tap 22 of a transformer 24 for completing the direct current path throughout a repeater network 17, as will be described hereinafter.

The repeater 16 will now be described with reference to FIG. 2 wherein an input transformed 30 having a single winding with a first end 31 is connected to the transmission line 15 and a tap 32 is connected to the other tranesmission line 15. A second end 33 of transformer 30 is connected to a base electrode of an NPN transistor 35, the emitter electrode of which is connected to a tap 34 spaced between the first end 31 and the tap 32. The transformer 30 is designed to have a low reactance with respect to the input impedance of the transistor 35 for differentiating and pulses applied between terminals 31 and 32. The collector electrode of the transistor 35 is connected to an output transformer 40 at a first end 41 with a second end 42 coupling the output signal to another length of transmission line 15'. A first tap 43 is also connected to another length of transmission line 15', and across the terminals 42 and 43, the regenerated signal appears. A tap 44 between end 42 and tap 43 is connected to the cathode of a Zener diode 45, the anode of which is connected to the emitter electrode of the transistor 35, for supplying a bias voltage for the transistor. Other biasing techniques may be employed if desired, for example, a plurality of forward biased diodes or even resistor networks may be used.

The D.C. power required to operate the repeater system 17 is supplied from the power sources 19 and 21 through center taps 18 and 22 of transformers 13 and 24, respectively. The sum of the source voltages 19 and 21 must be equal to the sum of the voltage drops occasioned by the Zener diodes in all the repeaters and the voltage drop in the transmission line itself. By employing the balanced pair transmission line, the D.C. current flow will be from source 21 through center tap 22 to repeater 16' and thence via transmission line 15' to repeater 16 and then through transmission line 15 to the center tap 18 to source 19. A complete current path is then provided by a common conductor 20 between sources 19 and 21. In the case of underwater transmission, the conductor 20 may be eliminated by grounding the positice terminal of source 19 and the negative terminal of source 21 and using the seawater as the return path. An additional benefit derived by using the balanced pair cable in preference to a coaxial cable is that the D.C. is split between two conductors and accordingly eliminates the need for large current carrying conductors.

The binary signal information transmitted from the pulse source 11 along with the D.C. power from sources 19 and 21 is coupled to the repeater 16 through the matching or coupling transformer 13 and then to the input transformer 30 of the repeater 16. In this way, the signal or pulse information is separated from the D.C. power at the input circuit. The signal information then appears across terminals 33 and 34 of transformed 30 and the D.C. power flows from terminal 32 to 34 and from terminal 31 to 34 where the current is combined and then passed through the Zener diode 45. The current is then split again by the output transformer 40 with a portion of the current flowing from terminal 44 to 43 and from terminal 44 to 42 where it is transmitted to the next length of transmission line 15' as a longitudinal current. The signal information, on the other hand, appears across the output terminals 42 and 43 and is transmitted through the transmission line 15' as a transverse signal.

As a result of current flow through Zener diode 45, a voltage drop equal to the breakdown voltage of the Zener diode is developed between the emitter and collector electrodes of the transistor 35. The base and emitter electrodes being transformer coupled, are at the same D.C. voltage potential and accordingly transistor 35 is cut-off. Upon receiving a positive growing signal between the base and emitter electrodes, the transistor will conduct for the duration of the signal. Therefore the transistor 35 is operating as an ON-OFF switch normally in the OFF position, and accordingly, does not require current from the power sources 19 and 21.

Before describing the operation of the repeater 16 in detail, it is first necessary to discuss some of the parameters of the transmission line and their effects of a binary signal train. For example, at frequencies below 100 k.c. a transmission line may be represented by a distributed circuit having series resistance and shunt capacitance. The response characteristic of this type line to a step function is the tabulated complementary error function; that is, a pulse may be synthesized by following a positive step by an equal negative step a short time later. Using this technique, it is found that the rectangular pulse shown in FIG. 3, waveform A, after being transmitted along a length of line has a characteristic wave shape B, as illustrated in FIG. 3. This pulse has a very long tail which extends into and beyond the third time interval where a following pulse might occur. A line exhibiting this characteristic would make it impossible to regenerate an undistorted pulse train and accordingly a certain amount of line equalization must be employed to overcome this difficulty. The simplest type of equalizer is a single reactive component that is used to perform the operation of differentation. The result of the differentation is illustrated in wave shape C of FIG. 3 where it can be seen that the differentiated signal has characteristics similar to the original pulse and the tail which is in the form of an undershoot, has been reduced, although it is still large enough to cause timing errors in a random pulse train. If this pulse is differentiated a second time, as illustrated by wave shape D in FIG. 3 nearly all the pulse energy is confined to the first two time intervals with the overshoot in the third time interval being quite small. Since the original unipolar pulse has been transformed into a signal having three excursions, two positive and one negative, the negative going portion of the signal can be used to regenerate the unipolar pulse to be transmitted along the next length of transmission line.

Referring now to FIG. 2, after a pulse has been transmitted from the pulse source 11, and coupled to the transmission line 15, the pulse appearing at the input of the repeater will be similar to that illustrated in wave shape B of FIG. 3. After differentiation in the transformer 30 as described previously, the signal appearing between the base and emitter electrodes of the transistor 35 will be substantially similar to that illustrated in wave shape C of FIG. 3 and that appearing between terminals 33 and 34 of transformer 30. As a result thereof, transistor 35 will conduct for the duration of the positive portion of the wave shape and the signal appearing at the collector electrode will be inverted from that of the base electrode signal. At the end of the positive going input signal, the transistor 35 will then revert to the cut-off condition since the D.C. bias on the base and emitter electrodes is equal. Immediately after cut-off of the transistor 35, the transformer 40 will exhibit a typical reverse voltage transient which will cause the output signal appearing across terminals 15' to have a positive excursion followed by a slight negative overshoot as illustrated in FIG. 2. This signal is then passed to the next repeater where it is differentiated a second time and again applied to the transistor 35 where it is again regenerated in the manner just described and applied to the next repeater. This sequnece of operation continues for each repeater in the repeater system and for each pulse transmitted from the source 11. In this manner, coded binary signals can be transmitted over great lengths without regard for maintaining the original pulse shape.

FIG. 4 illustrates a typical output pulse pattern from the last repeater in a repeater system in which a seven-bit binary code pattern of 1100101 is coupled from the secondary of a coupling transformer 24 to an input circuit of an amplifier and clipper stage 25. The transformer 24 is similar to transformer 13 and matches the transmission line impedance to that of the amplifier and clipper circuit 25. The function of the amplifier and clipper circuit 25 is to amplify and clip the binary pulse pattern so that it may be applied as an input signal to a bistable multivibrator (flip-flop) 26 for reconstructing discrete binary signals. The output of the amplifier and clipper circuit 25 is also coupled to a tuned amplifier 27 which is tuned to the carrier frequency (pulse repetition rate) of the system, for example, 100 kc. so that the output of the tuned amplifier 27 may be applied as a clock signal to the flip-flop 26. The output of the flip-flop 26 will then be a reconstructed binary pulse train which may then be used for processing at the receiving end.

The foregoing description has disclosed a novel repeater system for regenerating a coded pulse train in which a minimum number of components are employed and in which virtually undistorted signals can be reproduced at the receiving end even from a distorted signal at the transmitter.

Obviously, many modifications and variations of the present invention are possible in light of the above teachings. It is therefore to be understood, that within the scope of the appended claims, the invention may be practiced otherwise than as specifically described.

What is claimed is:

1. A pulse repeater for generating output pulses in a fixed time relationship to incoming pulses comprising:
   a plurality of transistors each having base, emitter, and collector electrodes;
   a plurality of input and output transformers each having a winding with first and second ends and first and second taps, said first taps spaced from said first ends and said second taps spaced from said second ends, said first end and said second tap of a first of said input transformers being adapted to be connected to a source of pulses, said second ends and said first taps of each of said input transformers being connected respectively to said base electrode and said emitter electrode of a respective one of said transistors for coupling pulses to said respective transistors and for controlling the conduction of said transistors, said first ends of said output transformers each being connected to said collector electrodes of a respective one of said transistors for providing respective current paths whereby output pulses issuing from said first taps and said second ends of said output transformers have a fixed time relationship to the incoming pulses to the associated input transformer;
   a plurality of diode means each connected betweeen said emitter electrode of a respective one of said transistors and said second tap of a respective one of said output transformers for establishing bias voltages for said transistors whereby incoming pulses to each said input transformer are regenerated in amplitude and time; and
   a plurality of transmission lines each connecting said first tap and said second end of a prior output transformer to said first end and said second tap of a subsequent input transformer forming a repeated network for communicating over great distances.

2. A pulse repeater as recited in claim 1 further comprising:
   means for supplying power to said repeater network as a longitudinal current divided equally between said first end and said second tap of said input transformer and said first tap and said second end of said output transformer.

3. A pulse repeater as recited in claim 2 wherein said means for supplying power comprises:
   a first coupling transformer having a primary and a secondary winding, said primary winding adapted to be connected to a source of pulses and said secondary winding having a center tap adapted to be connected to a first source of power, the ends of said secondary winding connected to the input transformer of a first repeater in said network; and
   a second coupling transformer having a primary winding with a center tap adapted to be connected to a second source of power in common with said first source of power and the ends of said primary winding connected to the output transformer of a last repeater in said network, whereby a current path is established in said network.

4. A pulse repeater as recited in claim 3 further comprising:
   means coupled to a secondary winding of said second coupling transformer for reconstructing discrete pulse signals having a fixed time relationship to said incoming pulses.

5. A pulse repeater as recited in claim 4 wherein said means coupled to said secondary winding of said second transformer comprises:
   means amplifying and clipping said output pulses;
   means responsive to the amplified and clipped pulses for generating a clock signal; and
   multivibrator means receiving said amplified and clipped pulses and said clock signal for reconstructing discrete binary pulses having a fixed time relationship to said incoming pulses.

References Cited

UNITED STATES PATENTS

| | | | |
|---|---|---|---|
| 2,517,960 | 8/1950 | Barney et al. | 330—40 X |
| 2,662,122 | 12/1953 | Ryder | 179—170 |
| 3,065,297 | 11/1962 | Wrathall | 178—70 |
| 3,249,703 | 5/1966 | Rickert | 179—170 |
| 3,281,708 | 10/1966 | Rogers et al. | 330—185 X |

RALPH D. BLAKESLEE, Primary Examiner

B. V. SAFOUREK, Assistant Examiner

U.S. Cl. X.R.

178—70; 179—170